(12) United States Patent
Mullner et al.

(10) Patent No.: US 11,786,897 B2
(45) Date of Patent: Oct. 17, 2023

(54) INERT APPARATUS FOR MICROFLUIDIC MOTION USING MAGNETIC SHAPE MEMORY MATERIAL

(71) Applicant: BOISE STATE UNIVERSITY, Boise, ID (US)

(72) Inventors: Peter Mullner, Boise, ID (US); Geoffrey Brent Johnston, Boise, ID (US); Aaron Smith, Meridian, ID (US); Andrew Armstrong, Boise, ID (US)

(73) Assignee: Boise State University, Boise, ID (US)

( * ) Notice: Subject to any disclaimer, the term of this patent is extended or adjusted under 35 U.S.C. 154(b) by 86 days.

(21) Appl. No.: 17/677,697

(22) Filed: Feb. 22, 2022

(65) Prior Publication Data

US 2022/0266246 A1 Aug. 25, 2022

Related U.S. Application Data

(60) Provisional application No. 63/151,932, filed on Feb. 22, 2021.

(51) Int. Cl.
| | | |
|---|---|---|
| *C12N 15/10* | (2006.01) | |
| *B01L 3/00* | (2006.01) | |
| *G01N 35/10* | (2006.01) | |
| *B01L 3/02* | (2006.01) | |
| *B33Y 80/00* | (2015.01) | |
| *B33Y 10/00* | (2015.01) | |
| *B33Y 70/00* | (2020.01) | |

(52) U.S. Cl.
CPC ..... *B01L 3/50273* (2013.01); *B01L 3/502707* (2013.01); *B01L 2200/12* (2013.01); *B01L 2300/0681* (2013.01); *B01L 2300/123* (2013.01); *B01L 2400/043* (2013.01); *B33Y 10/00* (2014.12); *B33Y 70/00* (2014.12); *B33Y 80/00* (2014.12)

(58) Field of Classification Search
CPC ........... B01L 3/50273; B01L 3/502707; B01L 2200/12; B01L 2300/0681; B01L 2300/123; B01L 2400/043; B01L 2200/141; B01L 2400/0481; B33Y 10/00; B33Y 70/00; B33Y 80/00; F03G 7/06147; F03G 7/0646; F04B 43/08
See application file for complete search history.

(56) References Cited

U.S. PATENT DOCUMENTS

2018/0021775 A1* 1/2018 Lindquist ............ B01L 3/50273
205/775

* cited by examiner

*Primary Examiner* — Jennifer Wecker
*Assistant Examiner* — Oyeleye Alexander Alabi
(74) *Attorney, Agent, or Firm* — PARSONS BEHLE & LATIMER

(57) ABSTRACT

A magnetic shape memory (MSM) microfluidic device may include a flexible membrane positioned between a channel and an MSM element. The MSM element may engage the flexible membrane to deform the channel at portions of the flexible membrane that are adjacent to non-contracted portions of the MSM element. The flexible membrane may prevent contact between a fluid within the channel and the MSM element. Magnetic field components may be applied to the MSM element and moved along the MSM element enable fluidic flow within the channel while. The device may include an upper portion including the flexible membrane and a lower portion including the MSM element. The upper portion may be interchangeable with additional upper portions.

20 Claims, 13 Drawing Sheets

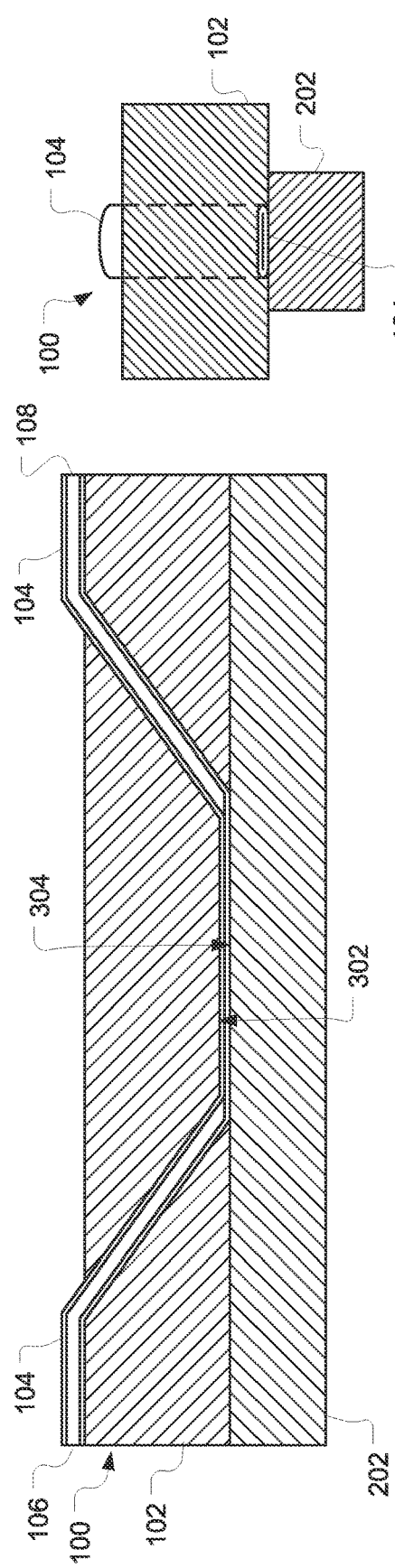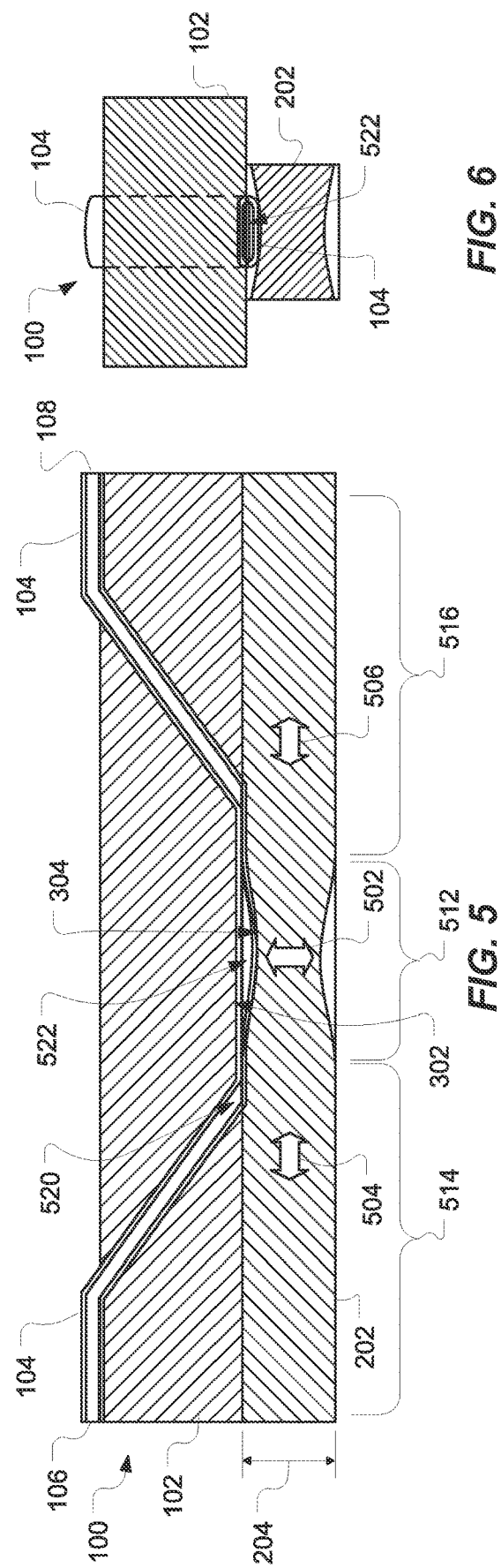

INERT APPARATUS FOR MICROFLUIDIC MOTION USING MAGNETIC SHAPE MEMORY MATERIAL

CROSS-REFERENCE TO RELATED APPLICATIONS

This application claims the benefit of U.S. Provisional Patent Application No. 63/151,932, filed Feb. 22, 2021, and entitled "Inert Apparatus for Microfluidic Motion Using Magnetic Shape Memory Material," the contents of which are incorporated by reference herein in their entirety.

GOVERNMENT LICENSE RIGHTS

This invention was made with government support under Award No. 1622856 issued by the National Science Foundation. The government has certain rights in the invention.

FIELD OF THE DISCLOSURE

This disclosure is generally related to the field of Microfluidic Motion and, in particular, to an inert apparatus for microfluidic motion using magnetic shape memory element.

BACKGROUND

Magnetic shape memory (MSM) alloys may deform strongly when subjected to a variable magnetic field. This property has made MSM alloys desirable for use for microfluidic motion (e.g., MSM micropumps). An MSM micropump may include an MSM material or element, where the MSM element may be actuated by a localized magnetic field to peristaltically transport fluid along the MSM materials surface. Some fluids may be reactive or may otherwise degrade or corrode the MSM element if contact occurs, which would negatively affect the performance of the MSM micropump. Further, in some cases, contact with the MSM element or other portions of a micropump may contaminate a fluid passing therethrough. In previously described devices, fluid being transported may wet an acrylic plastic, a silicone elastomer, and/or the MSM element itself.

SUMMARY

An embodiment disclosed herein is an MSM micropump where the fluid may wet only an inert material. This may be accomplished by encasing a microfluidic channel in a thin-walled tubing and interfacing this tubing with the inlet and outlet of the MSM micropump. Also disclosed is an embodiment and manufacture process of an MSM micropump that uses a block of inert material in a modular design. The fluid may flow through a channel in the block. The channel path may lead from an inlet through the block to very near a surface, then closely along the surface whereby it may be separated from the surface by only a very thin membrane, and finally to an outlet. The advantage of a modular pump is that the solid block can be removed from the pump and replaced by another block. The block may be relatively inexpensive compared to the pumping mechanism, which may include an MSM element and a magnetic field generator. This feature may be important for customers who handle fluids which are difficult to remove and require highly clean surfaces such as may occur standard in the medical sector.

In an embodiment, a magnetic shape memory (MSM) microfluidic device includes an MSM element having a dimension, and configured to contract across the dimension at a first portion of the MSM element that is exposed to a first component of a magnetic field, the first component substantially parallel to the dimension, and simultaneously not contract across the dimension at a second portion of the MSM element that is exposed to a second component of the magnetic field, the second component not substantially parallel to the dimension. The device may further include a flexible membrane positioned between a channel and the MSM element, where the MSM element engages the flexible membrane to deform the channel at portions of the flexible membrane that are adjacent to the MSM element, and where the flexible membrane prevents contact between a fluid within the channel and the MSM element.

In some embodiments, the MSM element engages the flexible membrane to enable a cavity to form at portions of the flexible membrane that are adjacent to contracted portions of the MSM element, and movement of the first component and second component of the magnetic field along the MSM element results in movement of the cavity. In some embodiments, the flexible membrane includes an inert material such as polyvinylchloride (PVC), polyethersulfone (PES), polytetrafluoroethylene (PTFE), low-density-polyethylene (PE-LD), high-density-polyethylene (PE-HD), ultra-high-molecular-weight polyethylene (PE-UHMW), polyurethane (PU), polyetherimide (PEI), polycarbonate (PC), polysulfone (PS), polyetheretherketone (PEEK), polypropylene (PP), polytetrafluoroethylene (PTFE, Teflon), or any combination thereof. In some embodiments, the device includes at least one port providing fluid access to the channel.

In some embodiments, the flexible membrane is a portion of a wall of a flexible tube, where the channel is defined within the flexible tube, where the device further includes a body, where the flexible tube is positioned between the body and the MSM element, and where the MSM element compresses the channel at the portions of the flexible membrane that are adjacent to the non-contracted portions of the MSM element by compressing the tube between the body and the MSM element at portions of the tube that are adjacent to the non-contracted portions of the MSM element, and where the MSM element opens the channel at portions of the tube that are adjacent to the contracted portions of the MSM element.

In some embodiments, the device includes an upper body, where the flexible membrane is a film fused to the upper body along a first portion of a surface of the upper body, and where the channel is defined along a second portion of the surface of the upper body to which the film is not fused. In some embodiments, the device includes a lower body configured to attach to the upper body, where the MSM element is positioned between the upper body and the lower body, and where the MSM element compresses the channel at the portions of the film that are adjacent to the non-contracted portions of the MSM element by compressing the film between the upper body and the MSM element at portions of the film that are adjacent to the non-contracted portions of the MSM element, and where the MSM element opens the channel at portions of the film that are adjacent to the contracted portions of the MSM element.

In some embodiments, the upper body is interchangeable with additional upper bodies having additional channels defined therein and having additional films, and wherein, when the additional upper bodies are attached to the lower body, the MSM element deforms the additional channels at portions of the additional films that are adjacent to the non-contracted portions of the MSM element by compressing the additional films between the additional upper bodies and the MSM element at portions of the additional films that are adjacent to the non-contracted portions of the MSM element, and wherein the MSM element opens the channel at portions of the additional films that are adjacent to the contracted portions of the MSM element.

In some embodiments, the device includes an upper body, where the channel is defined within the upper body, and a lower body configured to attach to the upper body, where the MSM element is attached to the lower body, where the membrane is a film attached to the lower body and covering the MSM element, where a pressure fit between the film and the upper body seals the channel when the upper body and the lower body are attached, and where the MSM element deforms the channel at the portions of the flexible membrane that are adjacent to the non-contracted portions of the MSM element by compressing the membrane between an inner surface of the channel and the MSM element. In some embodiments, the film is an adhesive tape and holds the MSM element in place. In some embodiments, the device includes a second membrane positioned between the MSM element and the lower body.

In an embodiment, a magnetic shape memory (MSM) actuation method includes exposing a first portion of an MSM element, having a dimension, to a first component of a magnetic field, the first component substantially parallel to the dimension, to contract the MSM element across the dimension at the first portion. The method further includes exposing a second portion of the MSM element to a second component of the magnetic field, the second component not substantially parallel to the dimension, to un-contract the MSM element across the dimension at the second portion. The method also includes engaging a flexible membrane to deform a channel at portions of the flexible membrane that are adjacent to the MSM element. The method includes preventing contact between a fluid and the MSM element using the flexible membrane.

In some embodiments, the method includes engaging the flexible membrane to enable a cavity to form at portions of the flexible membrane that are adjacent to contracted portions of the MSM element. In some embodiments, the method includes moving the first component and second component of the magnetic field along the MSM element to result in movement of the cavity. In some embodiments, the flexible membrane is incorporated into an upper body, where the MSM element is incorporated into a lower body. In some embodiments, the method includes interchanging the upper body with at least one additional upper body wherein at least one additional upper body comprises an additional flexible membrane. In some embodiments, the flexible membrane includes an inert material such as polyvinylchloride (PVC), polyethersulfone (PES), polytetrafluoroethylene (PTFE), low-density-polyethylene (PE-LD), high-density-polyethylene (PE-HD), ultra-high-molecular-weight polyethylene (PE-UHMW), polyurethane (PU), polyetherimide (PEI), polycarbonate (PC), polysulfone (PS), polyetheretherketone (PEEK), polypropylene (PP), polytetrafluoroethylene (PTFE, Teflon), or any combination thereof.

In an embodiment, a method includes forming an upper body from an inert material. The method further includes positioning a film adjacent to a surface of the upper body. The method also includes bonding the film to the upper body along a first portion of the surface of the upper body while refraining from bonding the film to the upper body along a second portion of the surface to define a channel between the surface of the upper body and the film. The method includes forming a lower body configured to attach to the upper body, where an MSM element is positioned between the upper body and the lower body when the lower body is attached to the upper body, and where the MSM element deforms the channel at portions of the film that are adjacent to non-contracted portions of the MSM element by compressing the film between the upper body and the MSM element at portions of the film that are adjacent to the non-contracted portions of the MSM element, and where the MSM element opens the channel at portions of the film that are adjacent to the contracted portions of the MSM element.

In some embodiments, bonding the film to the upper body includes applying heat and pressure to the film using a heat block shaped to apply heat adjacent to the first portion of the surface of the upper body and not applying the heat adjacent to the second portion of the surface of the upper body. In some embodiments, the method includes forming the film from a vulcanizing tape, where bonding the film to the upper body includes applying a catalyst to the first portion of the surface of the upper body, where the catalyst results in vulcanization of the vulcanizing tape at the first portion, and where the vulcanizing tape remains un-vulcanized at the second portion of the surface of the upper body. In some embodiments, forming the upper body and forming the lower body are performed using additive manufacturing such as high-resolution stereo lithography with liquid resin, digital light processing with liquid resin, and multi-jet printing.

BRIEF DESCRIPTION OF THE DRAWINGS

FIG. 3 is a front cross-section view diagram of the embodiment of the microfluidic device of FIG. 1 in a neutral state.

FIG. 4 is a side cross-section view diagram of the embodiment of the microfluidic device of FIG. 1 in a neutral state.

FIG. 5 is a front cross-section view diagram of the embodiment of the microfluidic device of FIG. 1 having an applied magnetic field.

FIG. 6 is a side cross-section view diagram of the embodiment of the microfluidic device of FIG. 1 having an applied magnetic field.

Figure 1:
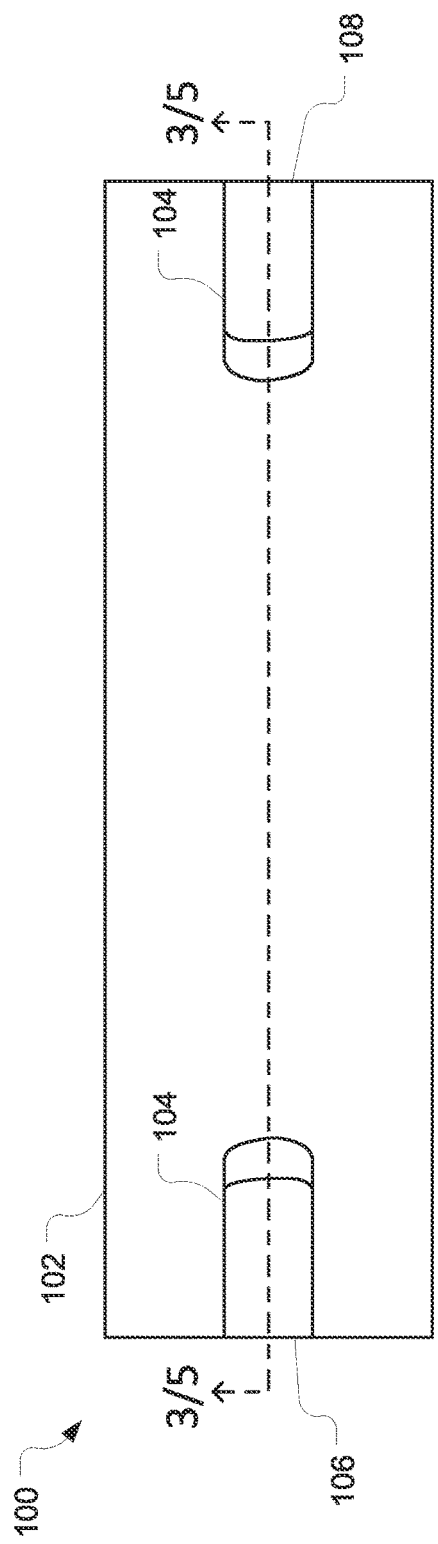
FIG. 1 is a top view diagram of an embodiment of a microfluidic device.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Existing MSM micropumps may comprise an MSM element that is cast in an elastomer and encased in a plastic chassis. The liquid that may be pumped from the inlet to the outlet may be carried by a small cavity on the MSM material that may be generated by a localized magnetic field. The fluid within the inlet may directly interface with the metal surface of the MSM element, contacting and moving along its surface as the cavity is translated from the inlet to the outlet. Examples of such micropumps may be described in U.S. Pat. No. 9,091,251, filed on Jul. 16, 2012 and entitled "Actuation Method and Apparatus, Micropump, and PCR Enhancement Method," U.S. Pat. No. 10,408,215, filed on Sep. 23, 2014 and entitled "Electrically Driven Magnetic Shape Memory Apparatus and Method," U.S. Pat. No. 10,535,457, filed on Mar. 31, 2016 entitled "Electrically Driven Magnetic Shape Memory Apparatus and Method," U.S. patent application Ser. No. 16/545,632, filed on Aug. 20, 2019, published as U.S. Patent App. Publication No. 2020/0066965, and entitled "Circular Magnetic Field Generator and Pump," and U.S. patent application Ser. No. 16/939,401, filed on Jul. 27, 2020, published as U.S. Patent App. Publication No. 2022/0025888, and entitled "Circular Magnetic Field Generator and Pump with Rotating Permanent Magnet," the contents of each of which are hereby incorporated by reference herein in their entirety.

The disclosed device may work similarly in principle. For example, the primary components of the inert MSM micropump may be the same, and the fluid may be carried by a cavity moving along the MSM element which is generated by a localized magnetic field.

However, with the disclosed device, the liquid may not come into contact with any of the aforementioned materials of the MSM micropump. Instead, the liquid may wet only an inert material as it is transported from the inlet to the outlet of the inert MSM micropump. This may be accomplished by the addition of a thin-walled tube made from an inert material. The pumping motion may be similar to a classic peristaltic pump as described in the above incorporated references, though it may be driven by a cavity drawing liquid into a closed tube rather than a pressure forcing liquid through an open tube.

An advantage may be that the fluid being pumped may not be exposed to any material besides the tube through which it is pumped. In previous pumps, the fluid may wet the plastic chassis (acrylic), the sealing elastomer (silicone), and/or the MSM element itself (an alloy of nickel, manganese and gallium). Frequently pumped fluids, such as blood, oils or organic solvents, may react with various materials, such as those in the current micropump, and may become contaminated. This problem may be eliminated by introducing a tube made from an inert material into the design. The pumped fluid may only wet this inert tube throughout the process which may preserve the integrity of the fluid being pumped and the integrity of the pump materials such as the MSM element.

Further, the disclosed design may be implemented in the form of a modular pump to enable the portion of the pump that comes in contact with a fluid to be easily replaced. This embodiment is described further herein.

Referring to FIG. 1, a top view of an embodiment of an MSM microfluidic device 100 is depicted. The microfluidic device 100 may include a body 102 having a flexible tube 104 passing therethrough. The flexible tube 104 may have a first end 106 that exits the body 102 near one side (i.e., to the left in FIG. 1) and a second end 108 that exits the body 102 near another side (i.e., to the right in FIG. 1). A cross section running laterally through the microfluidic device 100 is depicted further in FIGS. 3 and 5.

The flexible tube 104 may be formed from an inert material. For example, the material may include, but is not limited to, plastic material such as a high-performance, highly inert plastic such as polyvinylchloride (PVC), polyethersulfone (PES), polytetrafluoroethylene (PTFE), low-density-polyethylene (PE-LD), high-density-polyethylene (PE-HD), ultra-high-molecular-weight polyethylene (PE-UHMW), polyurethane (PU), polyetherimide (PEI), polycarbonate (PC), polysulfone (PS), polyetheretherketone (PEEK), polypropylene (PP), polytetrafluoroethylene (PTFE, Teflon), or any combination thereof. A wall of the flexible tube 104 may provide a membrane for separating an inside and an outside of the flexible tube 104. As such, portions of the flexible tube 104 may be referred to as a flexible membrane throughout this document.

Figure 2:
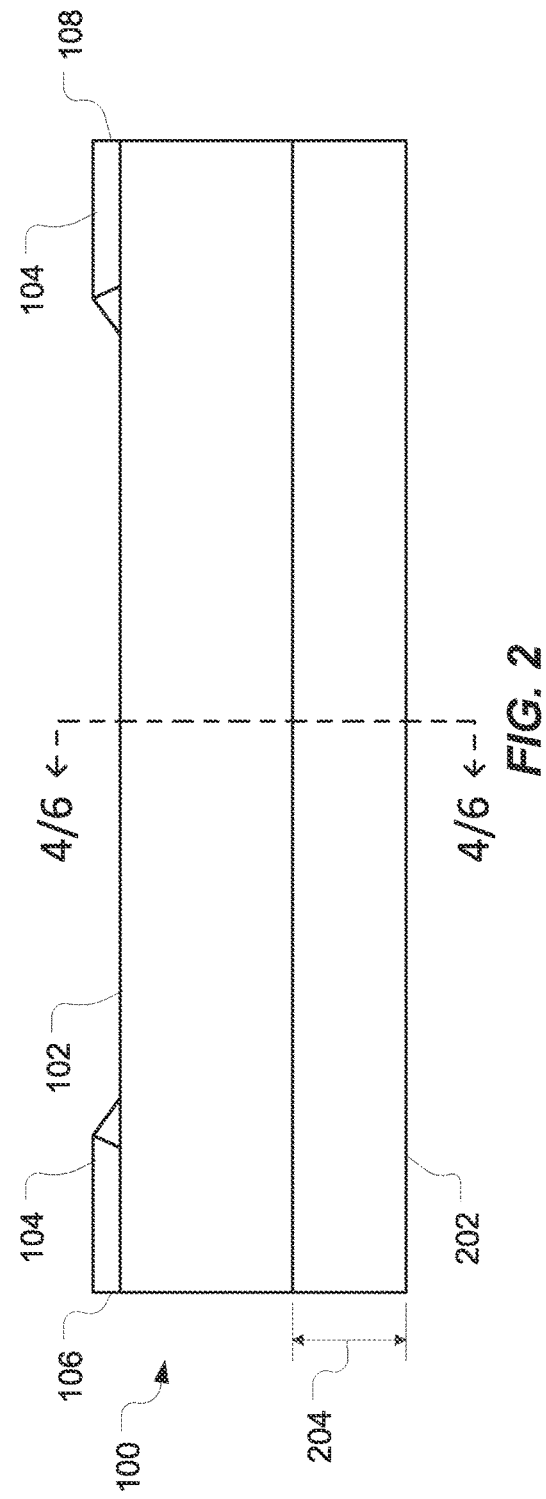
FIG. 2 is a front view diagram of the embodiment of the microfluidic device of FIG. 1.

Referring to FIG. 2, a front view of the microfluidic device 100 is depicted. The body 102 may have an MSM element 202 attached thereto. The MSM element may have a dimension 204 associated with it. In the depiction of FIG. 2, the dimension 204 is a width of the MSM element 202. As used herein for directional reference, an axis running parallel to the dimension 204 (i.e., running parallel to the width of the MSM element 202) is positioned vertically relative to the drawing in FIG. 2 and runs from a bottom of the MSM element 202 to a top of the MSM element 202, or vice-versa. An axis running perpendicular to the dimension 204 is positioned horizontally relative to the drawing in FIG. 2 and runs from a left side of the MSM element 202 to a right side of the MSM element 202, or vice-versa. A cross-section running vertically through the microfluidic device is depicted further in FIGS. 4 and 6.

The MSM element may include nickel, manganese, and gallium. Due to a twinning effect in its structure, the MSM element may deform in the presence of a magnetic field.

The microfluidic device depicted in FIGS. 1 and 2 may control and generate fluidic flow between the first end 106 and the second end 108 of the flexible tube 104. During operation, the MSM element 202 may engage the flexible tube 104 to deform a channel within the flexible tube 104 in response to different configurations of a magnetic field as described further herein.

A benefit of the device 100 is that any fluid that is displaced through the flexible tube 104 may be prevented from contacting the MSM element 202. Further, the fluid may contact only inert material as it is transported through the microfluidic device. This can prevent contamination of a fluid within the microfluidic device 100 and can also prevent degradation of the MSM element 202, or other components, from contact with potentially reactive substances. Other benefits may exist.

Referring to FIG. 3, a front cross section of the microfluidic device 100 is depicted. The flexible tube 104 is positioned inside the body 102 and runs between a surface 302 of the body 102 and a surface 304 of the MSM element 202. The flexible tube 104 may be deformed such that it is pressed closed where it is located between the surfaces 302, 304. This may prevent, or otherwise inhibit, any fluidic flow between the first end 106 and the second end 108 of the flexible tube 104.

Referring to FIG. 4, a side cross section of the microfluidic device 100 is depicted. As depicted, the flexible tube 104 may be compressed between the body 102 and the MSM element 202. This may represent an inactive, or natural, state of the microfluidic device 100.

Referring to FIG. 5, a front cross section of the microfluidic device 100 is depicted, where magnetic field components 502, 504, 506 have been applied to the MSM element 202. A first magnetic field component 502 may be parallel to the dimension 204 and may be applied to a first portion 512 of the MSM element 202. A second magnetic field component 504 may be perpendicular to the dimension 204 and may be applied to a second portion 514 of the MSM element 202. A third magnetic field component 506 may also be perpendicular to the dimension 204 and may be applied to a third portion 516 of the MSM element 202.

The MSM element 202 may be oriented such that any parallel magnetic field component causes the MSM element 202 to contract (i.e., reduce in width) at any portion of the MSM element 202 that is subjected to the parallel magnetic field component. Thus, the first magnetic field component 502 may cause the MSM element 202 to contract at the first portion 512 of the MSM element 202. Likewise, any perpendicular magnetic field components may cause the MSM element 202 to not contract (to maintain its shape) at any portion of the MSM element 202 that is subjected to the perpendicular magnetic field component. Thus, the second magnetic field component 504 and the third magnetic field component 506 may prevent the MSM element from contracting at the second portion 514 and the third portion 516, respectively.

The MSM element 202 may engage the flexible tube 104 to deform a channel 520 within the flexible tube 104 adjacent the second portion 514 of the MSM element 202 and adjacent to the third portion 516 of the MSM element 202. For example, the MSM element 202 may compress the flexible tube 104 between the body 102 and the second portion 514 and the third portion 516 of the MSM element 202. The compression may prevent fluidic flow through the channel 520.

By contracting at the first portion 512 of the MSM element 202, the MSM element 202 may disengage the flexible tube 104 at the first portion 512 and a cavity 522 may be formed within the compressed portion of the flexible tube 104 to accommodate fluid therein. However, because of the membrane (i.e., the walls of the flexible tube 104) the fluid may be prevented from directly contacting the MSM element 202 or the body 102.

Referring to FIG. 6, a side cross section of the microfluidic device 100 is depicted at the first portion of the MSM element 202 which has been contracted in response to the first magnetic field component 502. As depicted, the flexible tube 104 may be opened to form a cavity 522 between the body 102 and the MSM element 202. The cavity 522 may be fully encased by the walls or membrane of the flexible tube 104, thereby preventing contamination of any fluid within the flexible tube 104 and preventing any contact between a potentially reactive fluid and the MSM element 202 or the body 102.

Figure 7:
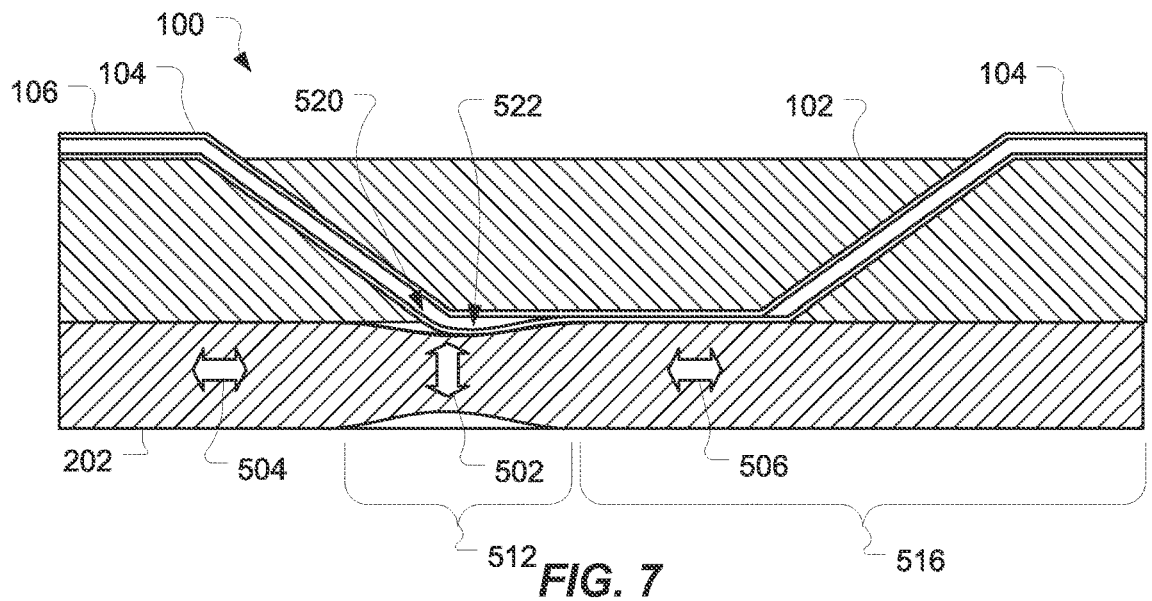
FIG. 7 is a front cross-section view diagram of the embodiment of the microfluidic device of FIG. 1 having a cavity at its left side.
Figure 8:
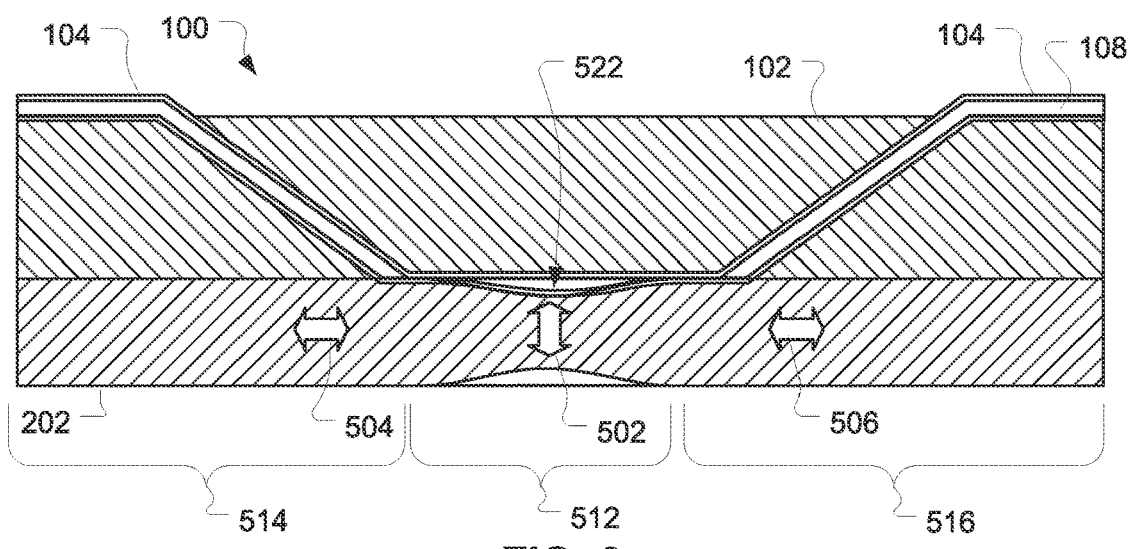
FIG. 8 is a front cross-section view diagram of the embodiment of the microfluidic device of FIG. 1 having a cavity at its center.
Figure 9:
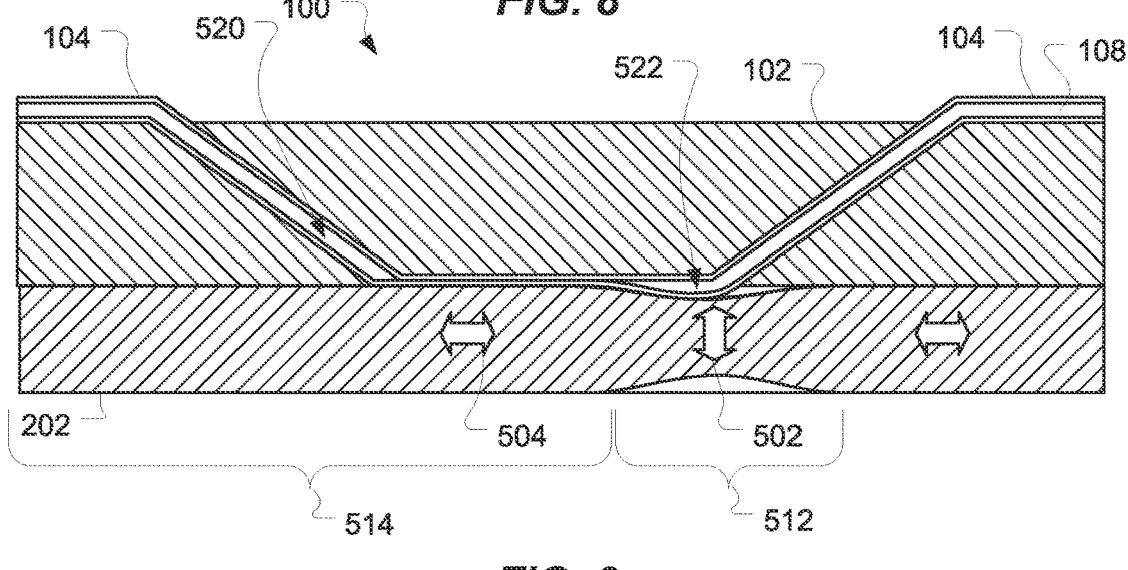
FIG. 9 is a front cross-section view diagram of the embodiment of the microfluidic device of FIG. 1 having a cavity at its right side.

Referring to FIGS. 7, 8, and 9, progressive movement of fluid from the first end 106 of the flexible tube 104 to the second end 108 of the flexible tube 104 through the channel 520 is depicted. Although depicted in discrete steps, the configurations in FIGS. 7, 8, and 9 may be performed through continuous motions of the magnetic field components 502, 504, 506. Movement of the magnetic field components may be achieved in multiple different ways. In some cases, a rotating magnetic field may be generated by rotating a permanent magnet. In other cases, a rotating magnetic field may be generated electronically through the use of electronic coils placed perpendicularly to each other. In yet other cases, shifting magnetic field components may be generated through the use of a series of electronic coils combined with a controller to enable fine tuning of the magnetic field along the MSM element 202.

Referring to FIG. 7, the first magnetic field component 502 may be left-aligned, resulting in the first portion 512 of the MSM element 202 (i.e., the contracted portion) being positioned adjacent to a location where the flexible tube 104 meets the MSM element 202 nearest to the first end 106. Under the influence of the third magnetic field component 506, the MSM element 202 may compress the flexible tube 104 between the body 102 and MSM element 202 thereby blocking fluid flow through the channel 520. However, because the first portion 512 of the MSM element 202 is contracted, the cavity 522 may form in the flexible tube 104 and fluid communication may be established between with the first end 106 of the flexible tube 104 and the cavity 522.

Referring to FIG. 8, the first magnetic field component 502 may shifted until it is centered within the body 102. As such, the first portion 512 of the MSM element 202 (i.e., the contracted portion) is also positioned at a center of the flexible tube 104. Due to the second magnetic field component 504 and the third magnetic field component 506, the MSM element 202 may compress the flexible tube 104 between the body 102 and MSM element 202 on both sides of the cavity 522 (i.e., adjacent to the second portion 514 and the third portion 516 of the MSM element 202). Thus, the cavity 522 may carry fluid toward the second end 108 of the flexible tube 104.

Referring to FIG. 9, the first magnetic field component 502 may continue to move so that it is right-aligned, resulting in the first portion 512 (i.e., the contracted portion) of the MSM element 202 being positioned adjacent to a location where the flexible tube 104 meets the MSM element 202 nearest to the second end 108. Thus, the cavity 522 may be in fluid connection with the second end 108 of the flexible tube 104. Further, the second magnetic field component 504 may cause the MSM element 202 to compress the flexible tube 104 between the body 102 and MSM element 202 at the second portion 514 of the MSM element 202, thereby blocking further fluid flow within the channel 520. In this way, fluid flow may be precisely performed.

Based on the operations described in FIGS. 7-9, microfluidic flow may be established and precisely controlled through the channel 520. Further, because the fluid is contained within the flexible tube 104, contamination of the fluid by materials used in the body 102 or the MSM element 202 may be prevented. Likewise, the body 102 and the MSM element 202 may be protected from potentially reactive fluids. Thus, degradation of the components in the device 100 may be avoided. Other benefits and advantages may exist.

Figure 10:
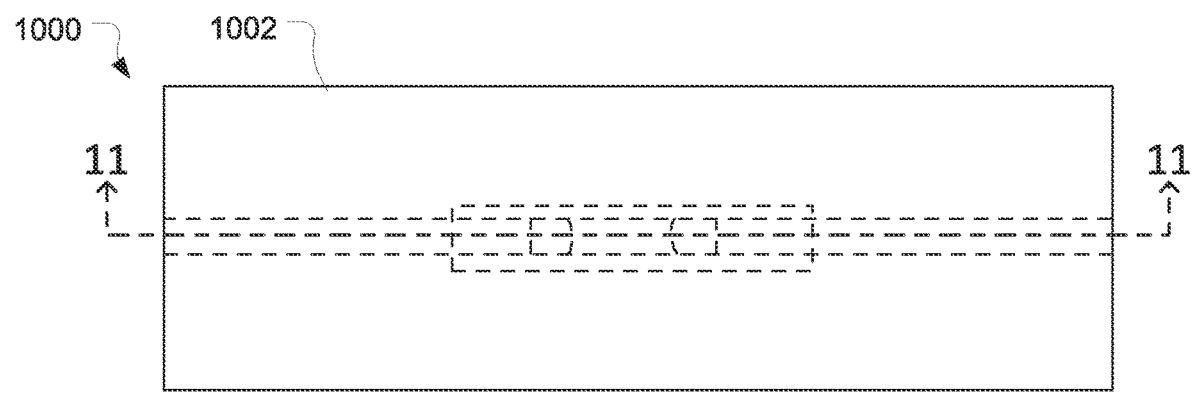
FIG. 10 is a top view diagram of an embodiment of a microfluidic device.
Figure 11:
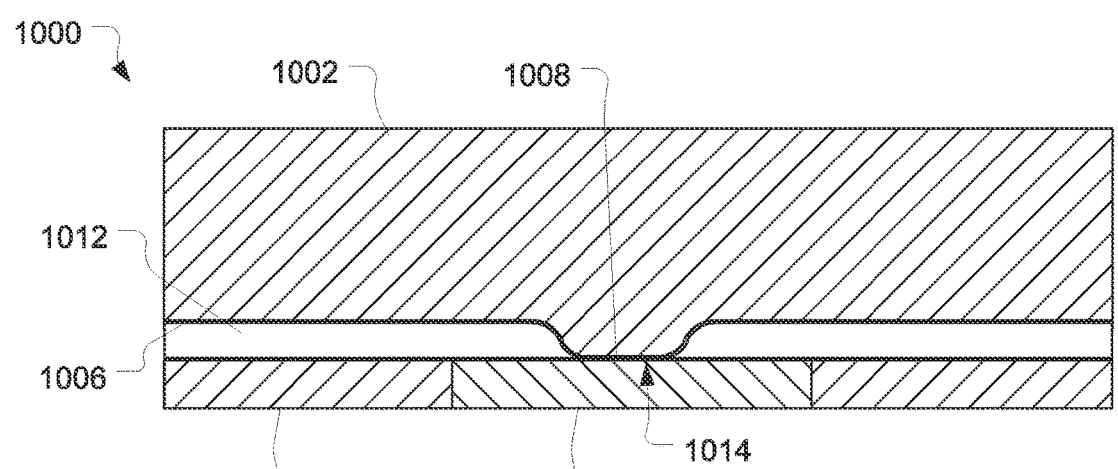
FIG. 11 is a front cross-section view diagram of the embodiment of the microfluidic device of FIG. 10.
Figure 12:
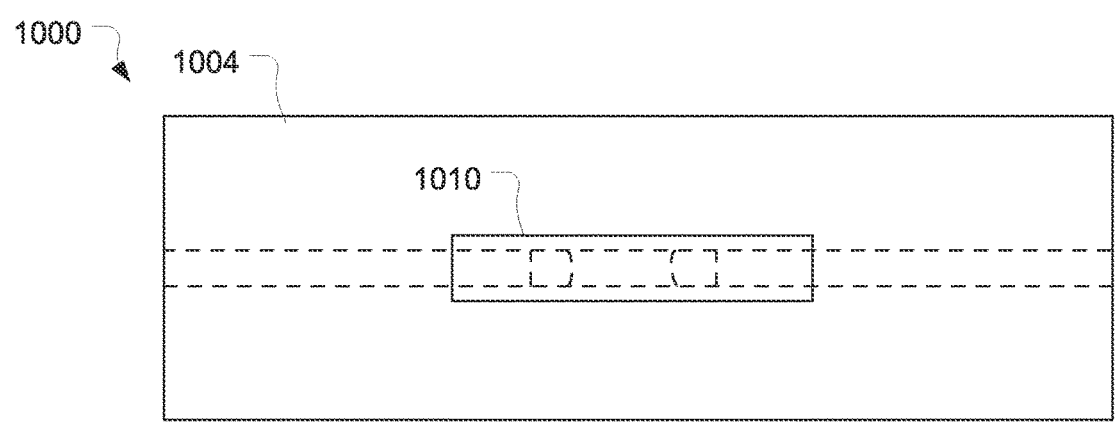
FIG. 12 is a bottom view diagram of the embodiment of the microfluidic device of FIG. 10.

Referring to FIGS. 10-12, another embodiment of a microfluidic device 1000 is depicted. The device 1000 overall design of the device 1000 may be substantially similar to the device 100. However, the proportions of the device 1000 are different. FIG. 10 depicts a top view of the device 1000. FIG. 11 depicts a cross section front view of the device 1000. FIG. 12 depicts a bottom view of the device 1000. The device 1000 is describe below with simultaneous reference to FIGS. 10-12.

The device 1000 may include an upper body 1002, a lower body 1004, a flexible tube 1006, and an MSM element 1010. The flexible tube 1006 may be positioned between the upper body 1002 and the lower body 1004 and may have a channel 1012 formed therein. A section 1008 of the upper body 1002 may protrude downward to create a surface 1014 for compressing the flexible tube 1006 between the MSM element 1010 and the upper body 1002. By compressing the flexible tube 1006, fluid flow through the channel 1012 may be prevented.

As described with reference to the device 100, the device 1000 may be used to generate fluid flow through the channel 1012 by applying a continuously moving magnetic field to the MSM element 1010. The continuously moving magnetic field may create a cavity in the MSM element 1010 that scans along the downward protruding portion of the upper body 1002 to move a fluid through the channel 1012. The flexible tube 1006 acts as a membrane to prevent fluid within the channel 1012 from making contact with the MSM element 1010, the upper body 1002, or the lower body 1004. This may help prevent fluid contamination and also prevent the degradation of the microfluidic device 1000.

Figure 13:
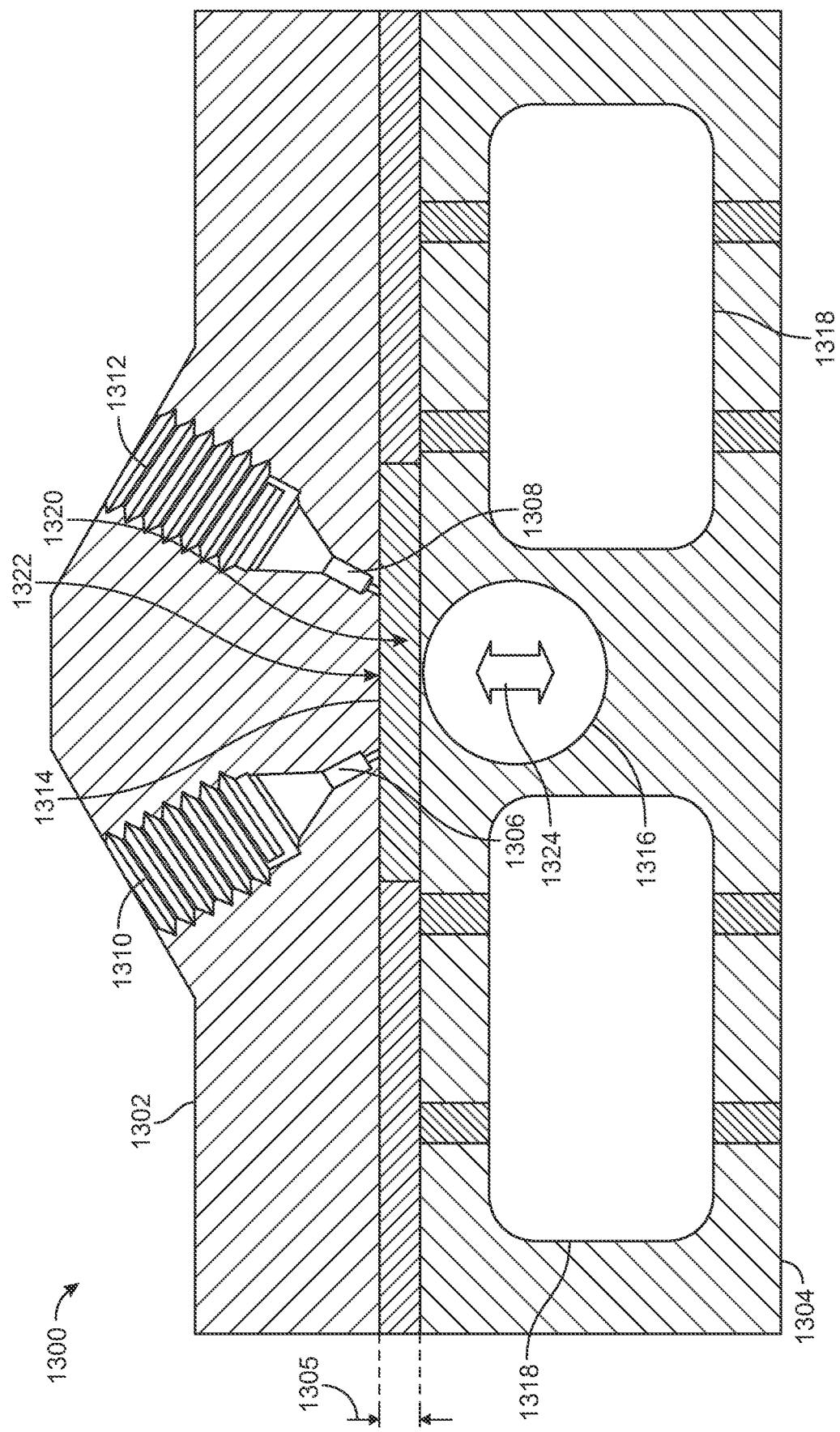
FIG. 13 is a front cross-section view diagram of an embodiment of a modular microfluidic device.

Referring to FIG. 13, an embodiment of a microfluidic device 1300 is depicted. As described below, the device 1300 may have a modular design to enable interchangeability between individual components of the device 1300. The device 1300 may include an upper body 1302 and a lower body 1304. The upper body 1302 may include a first port 1306 and a second port 1308. Although not visible in FIG. 13, a channel may exist between the first port 1306 and the second port 1308 as described further herein. Threading 1310, 1312 may be formed within the upper body 1302 to enable connection of external tubing or conduits to the ports 1306, 1308. Although not shown in the other figures, any of the embodiments described herein may include threaded input and output ports. For example, referring to the device 100 of FIG. 1, the flexible tube 104 may connect to threaded ports at the first end 106 and at the second end 108 of the flexible tube 104.

The lower body 1304 of the device 1300 may include an MSM element 1314, a magnetic field generator 1316, and one or more magnetic yokes 1318. The magnetic field generator 1316 is depicted as a rotatable permanent magnet in FIG. 13. However, any type of magnetic field generator (such as a set of electronic coils) that can create a magnetic field having shiftable or rotatable magnetic field components may be used with the device 1300.

The MSM element 1314 may have a dimension 1305 (i.e., a width) and may be configured to contract across the dimension 1305 at a first portion 1320 of the MSM element that is exposed to a magnetic field component that is parallel to the dimension 1305. The MSM element 1314 may also simultaneously not contract across the dimension 1305 at a second portion 1322 of the MSM element 1314 that is exposed to a second magnetic field component that is not substantially parallel to the dimension. For simplicity, a single magnetic field 1324 is symbolically represented, but it should be understood that the magnetic field 1324 radiates both parallel and perpendicular magnetic field components through the MSM element 1314 as describe with reference to the device 100.

Figure 14:
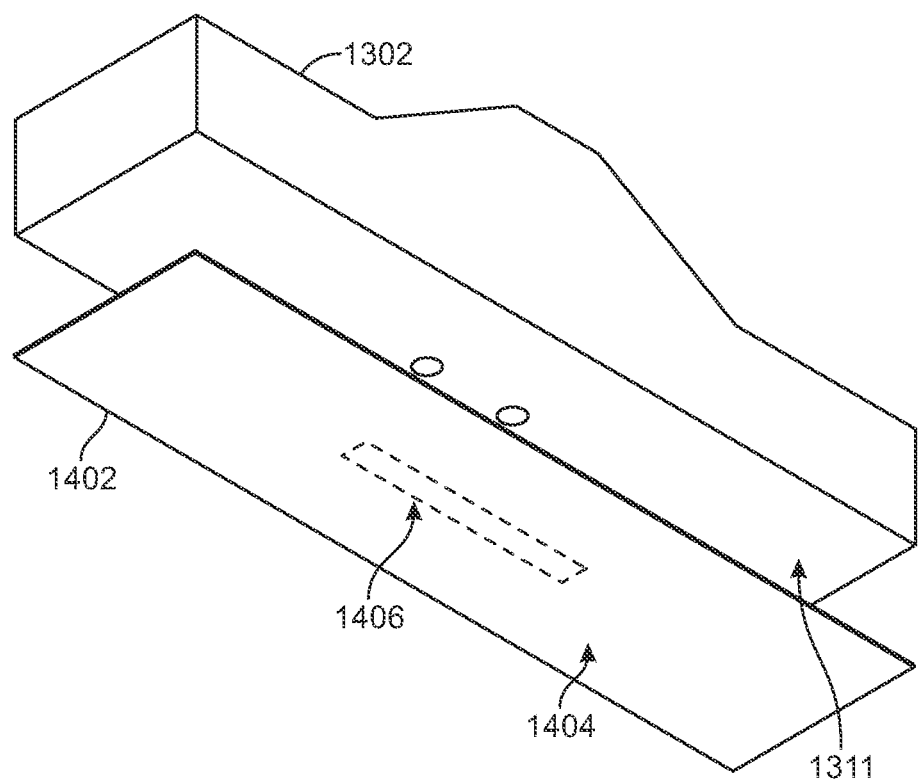
FIG. 14 is an exploded perspective view diagram of an upper body of an embodiment of a modular microfluidic device.

Referring to FIG. 14, an exploded view of the structure of the upper body 1302 is depicted. A film 1402 (also referred to herein as a membrane) may be fused to the upper body 1302 along a first portion of a surface 1311. The first portion may correspond to a perimeter area 1404 of the film 1402. The film 1402 may not be fused in a center area 1406 of the film 1402. This may form a channel between the upper body 1302 and the film 1402 along the center area 1406.

Figure 15:
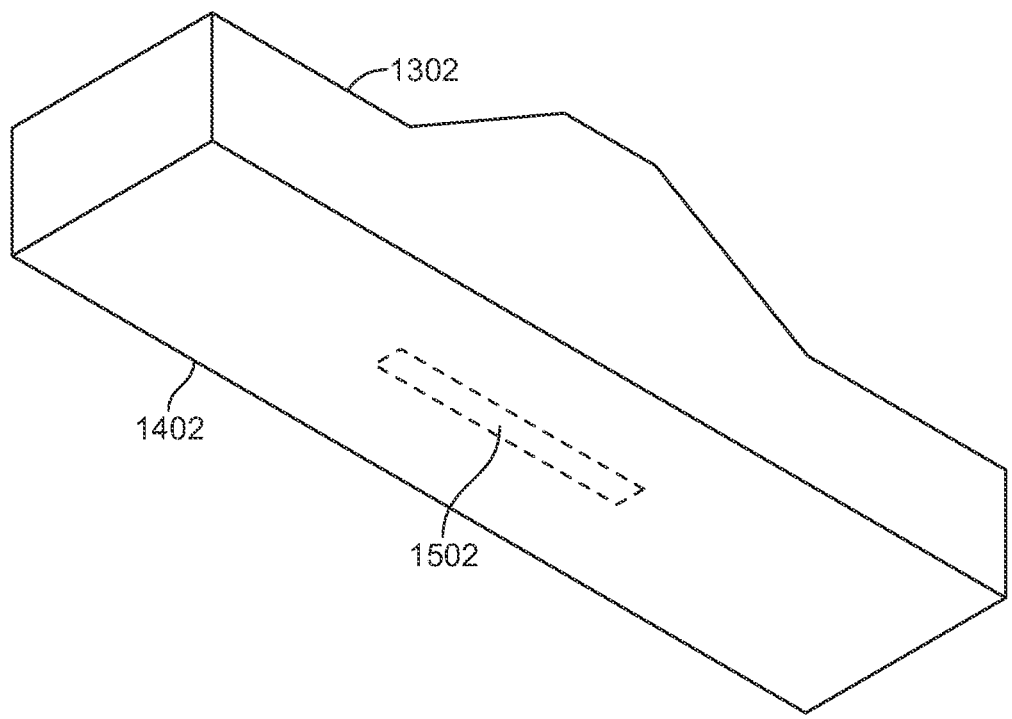
FIG. 15 is a perspective view diagram of the upper body of an embodiment of a modular microfluidic device.

Referring to FIG. 15, the completed upper body 1302 is depicted. A channel 1502 is defined between the upper body 1302 and the film 1402 where the film 1402 is not fused to the upper body 1302. Returning to FIG. 13, the MSM element 1314 may engage the film 1402, which is not depicted in FIG. 13, but is depicted in FIG. 14. The MSM element 1314 may deform the channel 1502 at portions of the film 1402 that are adjacent to non-contracted portions of the MSM element 1314. Likewise, the MSM element may disengage the flexible membrane to enable a cavity (e.g., as shown with respect to the device 100) to form at portions of the film 1402 that are adjacent to contracted portions of the MSM element 1314. As with the device 100, movement of the magnetic field 1324 may result in movement of the cavity, thereby enabling fluid to be pumped through the channel 1502. As with the devices 100, 1000, the device 1300 may be formed, at least partially, from inert plastics, including, but not limited to, PVC, PES, PTFE, PE-LD, PE-HD, PE-UHMW, PU, PEI, PC, PS, PEEK, PP, PTFE, Teflon, or any combination thereof. In some cases, the upper body 1302 and the lower body 1304 may be formed using high-resolution stereo lithography with liquid resin.

Varying operations may be performed to fuse the upper body 1302 to the film 1402. In a first case, the film 1402 may be of the same material as the upper body 1302, but the film 1402 may having a slightly higher melting temperature. The film 1402 may be welded onto the upper body 1302 by applying heat and pressure to the film 1402 while it is stacked on the upper body 1302. The heat and pressure may be applied only to the perimeter area 1404 such that the film 1402 bonds to the upper body 1302 along the perimeter area 1404 but not at the center area 1406. This may be achieved by heating a metal block with a flat area matching the bottom face of the upper body 1302. The heating block may have a cavity that matches the shape of the channel 1502 such that the metal heating block touches the film only along the perimeter area 1404.

In another case, the film 1402 may be formed from a vulcanizing tape. Fusing the film 1402 to the upper body may include applying a catalyst to a surface of the upper body 1302. The catalyst may be applied where it will contact the perimeter area 1404 but not the center area 1406, where the channel 1502 is to be formed. The catalyst may result in vulcanization of the vulcanizing tape along the perimeter area 1404, thereby fusing the vulcanizing tape to the upper body 1302. The vulcanizing tape may remain un-vulcanized at the center area 1406 to form the channel 1502.

The device 1300 may have multiple benefits and advantages. For example, during fluid displacement through the channel 1502, the film 1402 may prevent contact between a fluid and the MSM element 1314. Further, the device 1300 may be constructed with a modular design as described with regard to FIG. 16.

Figure 16:
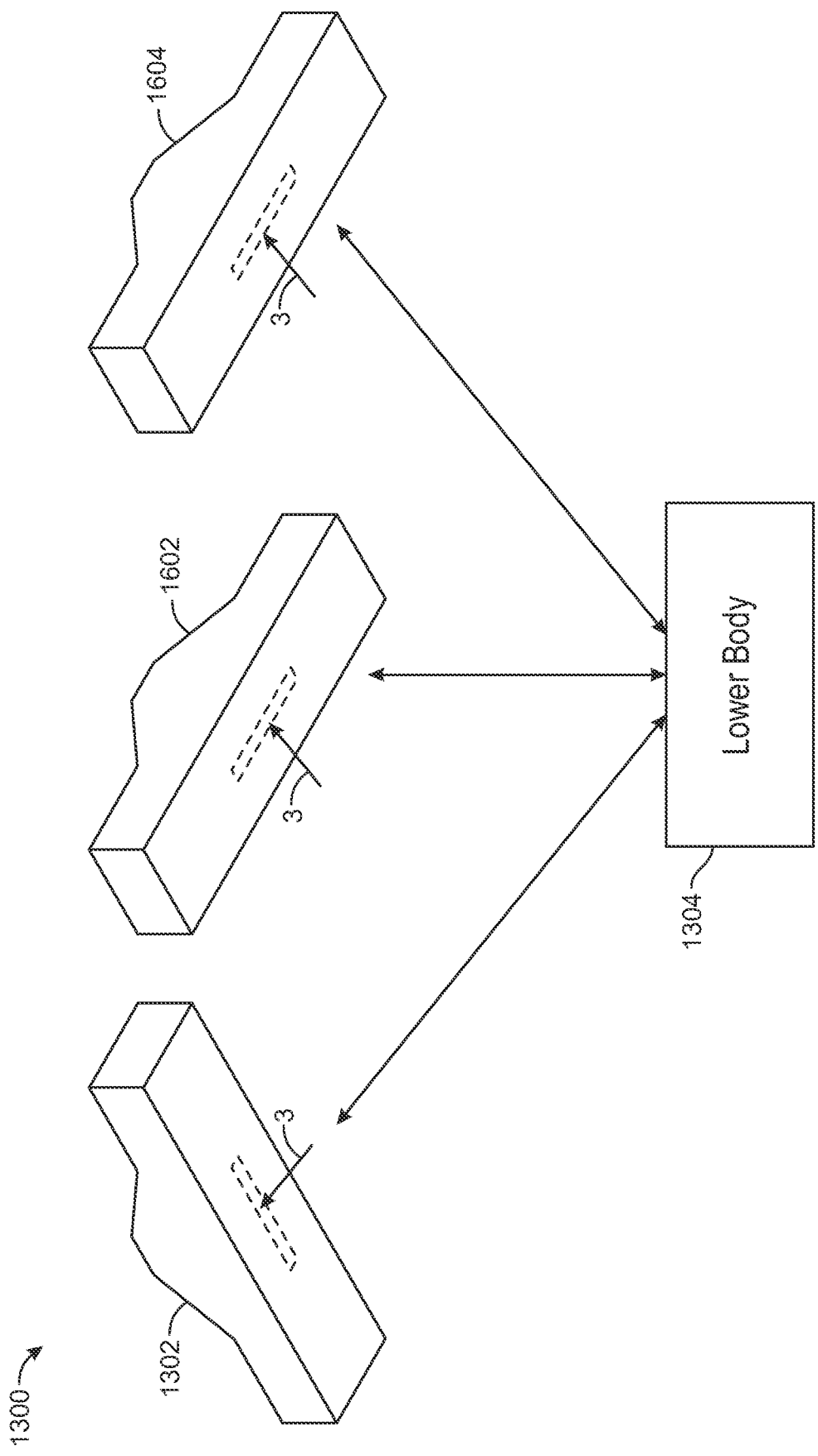
FIG. 16 is a block diagram depicting the interchangeability of upper bodies with lower bodies of an embodiment of a modular microfluidic device.

Referring to FIG. 16, the upper body 1302 may be interchangeable with additional upper bodies 1602, 1604. Each of the additional upper bodies 1602, 1604 may have the same design and structure as the upper body 1302. As such, the additional upper bodies 1602, 1604 may have additional channels defined therein by additional films. The additional upper bodies 1602, 1604 may be configured to attach to the lower body 1304. As with the upper body 1302, the MSM element 1314 of the lower body 1304 may deform the additional channels within the additional upper bodies 1602, 1604 at portions of the additional films of that are adjacent to the non-contracted portions of the MSM element in the same way as described with reference to the upper body 1302 (i.e., by compressing the additional films between additional inner surfaces of the additional channels and the MSM element).

The modular design of the device 1300 may enable multiple fluids to be used with the device 1300 without cross contamination. Further, the upper body 1302 and additional upper bodies 1602, 1604 may be formed from inexpensive plastic molding and fusing processes and may be suitable for single use. The lower body 1304 may include more complex structures, such as the MSM element 1314, and may be reused multiple times. Other advantages may exist.

Figure 17:
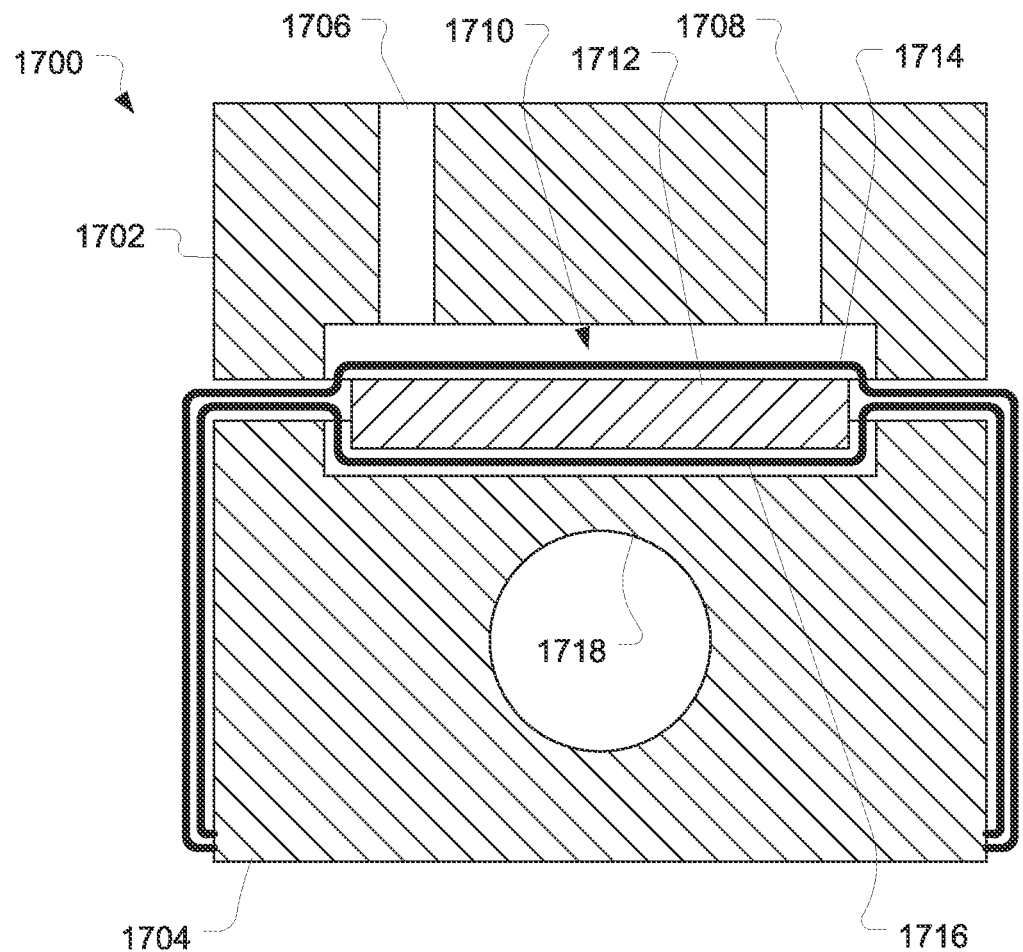
FIG. 17 is an exploded front cross-section view diagram of an embodiment of a microfluidic device.

Referring to FIG. 17, an embodiment of a microfluidic device 1700 is depicted. The device 1700 may include an upper body 1702 and a lower body 1704. The upper body 1702 may include a first port 1706 and a second port 1708. A channel 1710 may be formed between the first port 1706 and the second port 1708. The lower body 1704 may include an MSM element 1712 and a bore 1718 to enable the inclusion of a rotating permanent magnet.

A first inert tape 1714 (also referred to herein as a film or a membrane) may be applied to the MSM element between the upper body 1702 and the MSM element 1712. The first inert tape 1714 may be an adhesive tape and may hold the MSM element 1712 in place. A second inert tape 1716 may be applied between the MSM element 1712 and the material of the lower body 1704. In response to the upper body 1702 and the lower body 1704 being pressed together, the upper body 1702 may form a pressure fit with the first inert tape 1714 to seal the channel 1710 such that the first inert tape 1714 prevents fluidic flow between the first port 1706 and the second port 1708. As with the devices 100, 1000, and 1300 the device 1700 may be formed, at least partially, from inert plastics, including, but not limited to, PVC, PES, PTFE, PE-LD, PE-HD, PE-UHMW, PU, PEI, PC, PS, PEEK, PP, PTFE, Teflon, or any combination thereof.

The operation of the device 1700 may be the same as the devices 100, 1000, and 1300 described herein. The MSM element 1712 may be configured to contract across its width at a portion of the MSM element 1712 that is exposed to a magnetic field component that is parallel to the width. The MSM element 1712 may also simultaneously not contract across the width at portions of the MSM element that are exposed to second magnetic field components that are not substantially parallel to the width. The MSM element 1712 may compress the channel 1710 at portions of the first inert tape 1714 that are adjacent to the non-contracted portions of the MSM element 1712 by compressing the first inert tape 1714 between the upper body 1702 and the MSM element 1712. The MSM element 1712 may further form a cavity at the contracted portion of the MSM element 1712. By shifting or rotating the magnetic field, the cavity may be used to move fluid from the first port 1706 to the second port 1708, and vice-versa.

In addition to the benefits cited with reference to the devices 100, 1000, 1300, a benefit of the device 1700 may be its simplicity of manufacture. For example, the upper body 1702 and the lower body 1704 may be formed from simple shapes. The first inert tape 1714 and the second inert tape 1716 may include a standard electrical tape. This can result in lower manufacturing costs. Other benefits may exist.

Referring to FIGS. 18-23, another embodiment of a microfluidic device 1800 is depicted. The overall design of the device 1800 may be substantially similar to the device 1700. However, the proportions of the device 1800 may be different.

Figure 18:
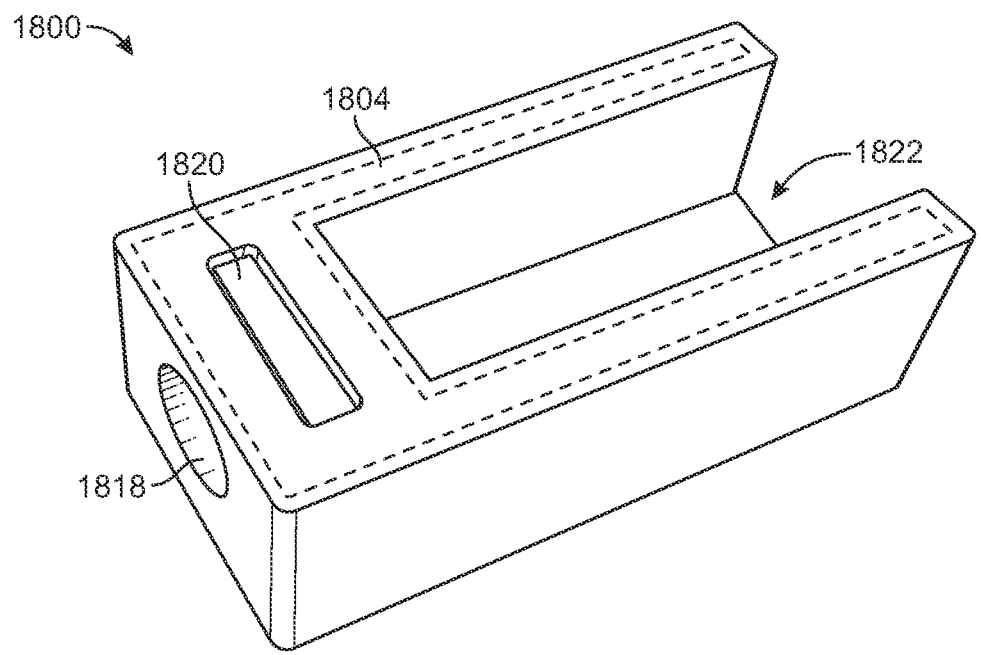
FIG. 18 is a perspective view diagram of a lower body of an embodiment of a microfluidic device.
Figure 19:
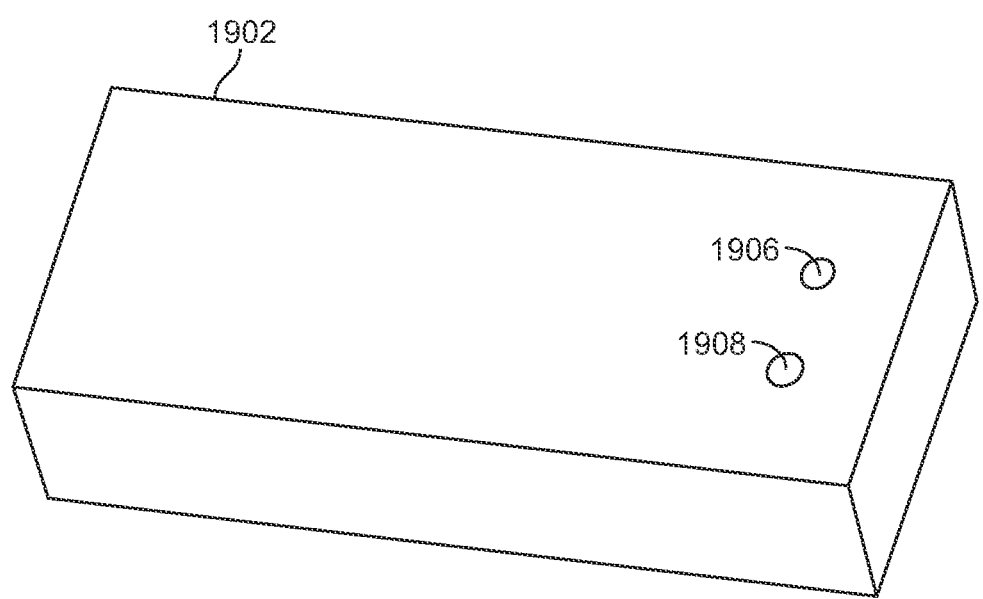
FIG. 19 is a perspective view diagram of an upper body of an embodiment of a microfluidic device.

Referring to FIG. 18, a lower body 1804 of the microfluidic device 1800 is depicted. The lower body 1804 may include a slot 1820 configured to receive an MSM element therein, a bore 1818 configured to receive a rotatable permanent magnet therein, and a cavity 1822 configured to receive a motor capable of turning the rotatable permanent magnet, as will be depicted in later figures. Referring to FIG. 19, an upper body 1902 is depicted. The upper body 1902 may include a first port 1906 and a second port 1908.

Figure 20:
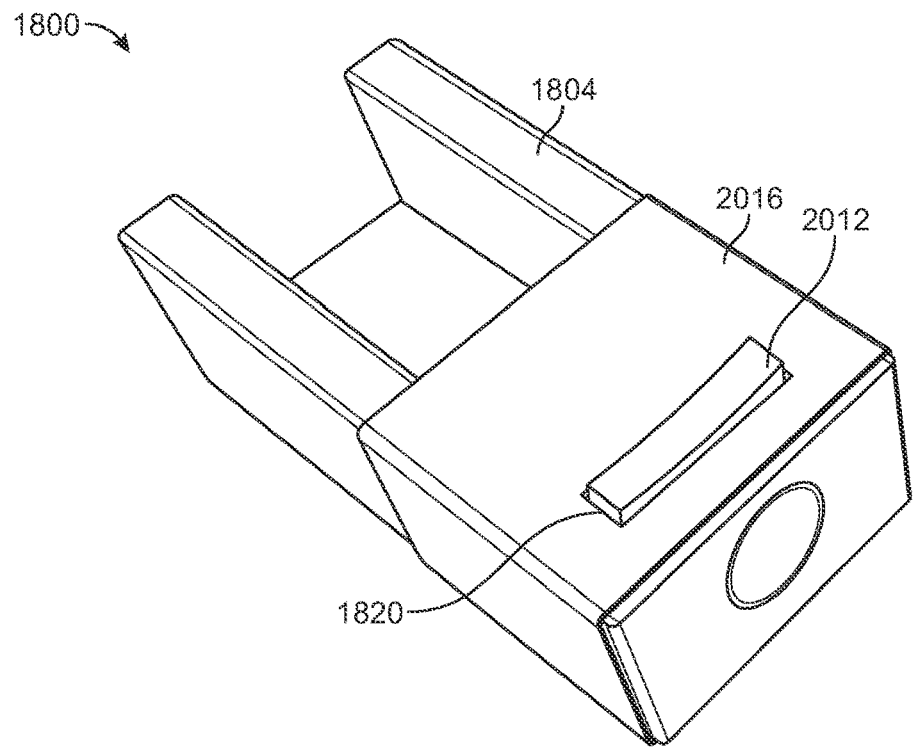
FIG. 20 is a perspective view diagram of a lower body of an embodiment of a microfluidic device having an inert tape under an MSM element.
Figure 21:
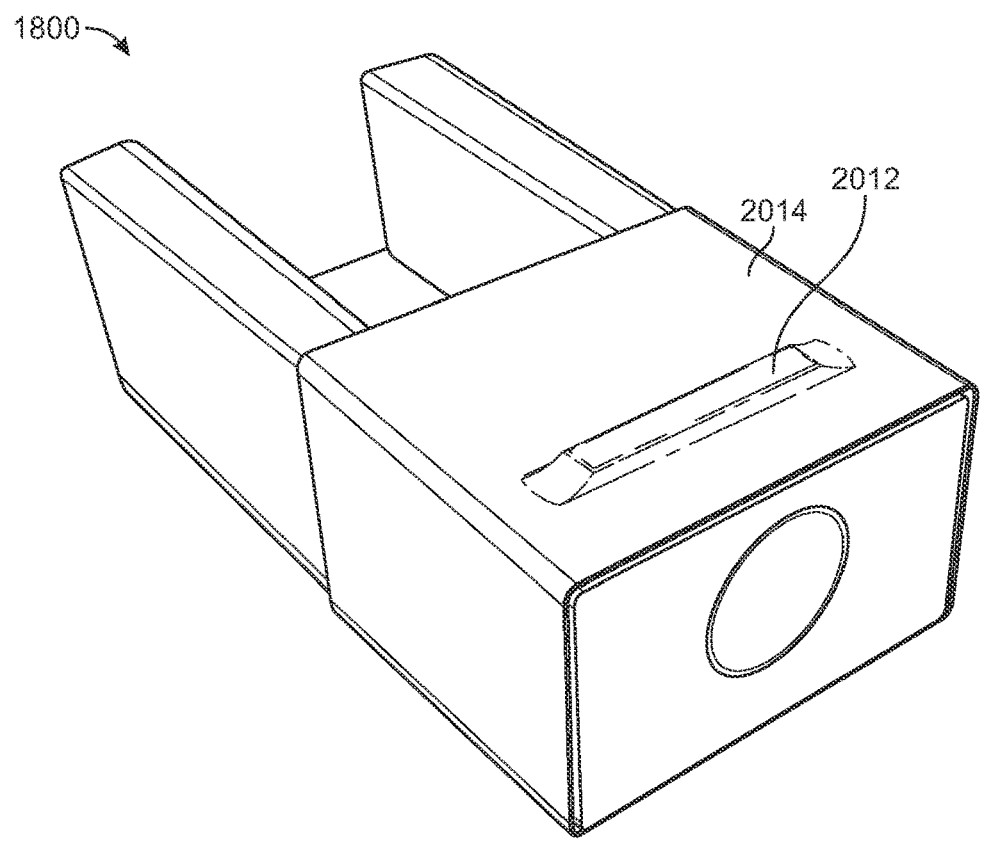
FIG. 21 is a perspective view diagram of a lower body of an embodiment of a microfluidic device having another inert tape over the MSM element with respect to FIG. 20.

Referring to FIG. 20, the lower body 1804 of the microfluidic device 1800 is depicted with an inert tape 2016, which may correspond to the second inert tape 1716 of FIG. 17, attached to the lower body 1804. The inert tape 2016 may be an adhesive tape and may correspond to electrical tape. An MSM element 2012 may be positioned atop the inert tape 2016 within the slot 1820. Referring to FIG. 21, another inert tape 2014 may be positioned over the MSM element 2012 and may hold it in place. The inert tapes 2014, 2016 may prevent fluid from coming into contact with the MSM element 2012 during operation of the microfluidic device 1800.

Figure 22:
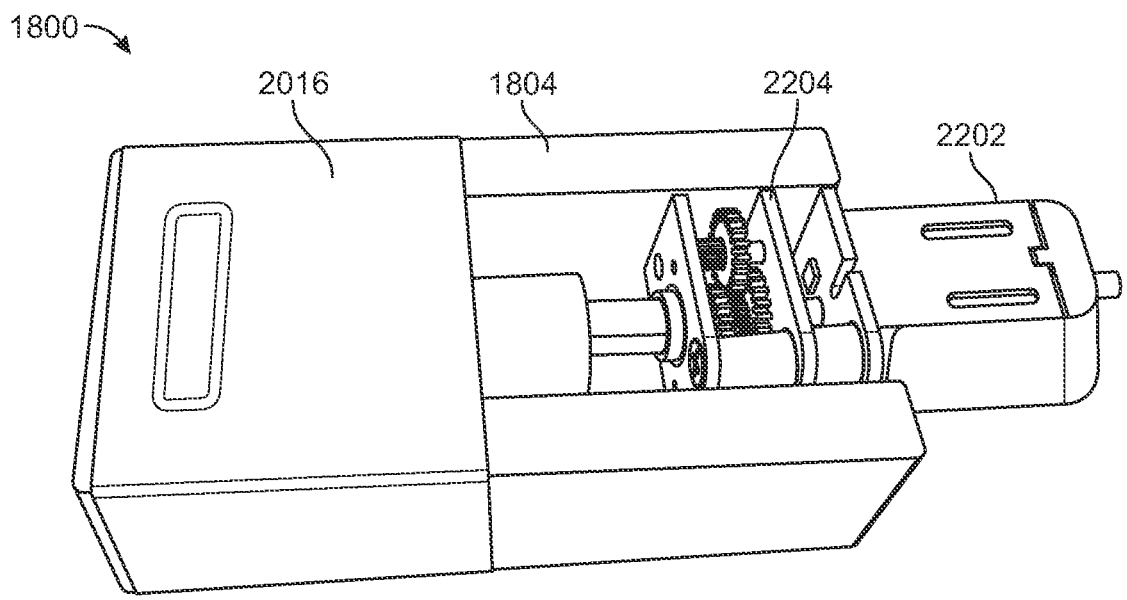
FIG. 22 is a perspective view diagram of a lower body of an embodiment of a microfluidic device having a motor and gearbox installed therein.

Referring to FIG. 22, the lower body 1804 is depicted with the inert tape 2016 attached thereto. Further, a motor 2202 and an associated gearbox 2204 may be positioned within the lower body 1804. The motor 2202 may drive a rotating permanent magnet to produce a rotating magnetic field used to drive the MSM element 2012 (shown in FIG. 20).

Figure 23:
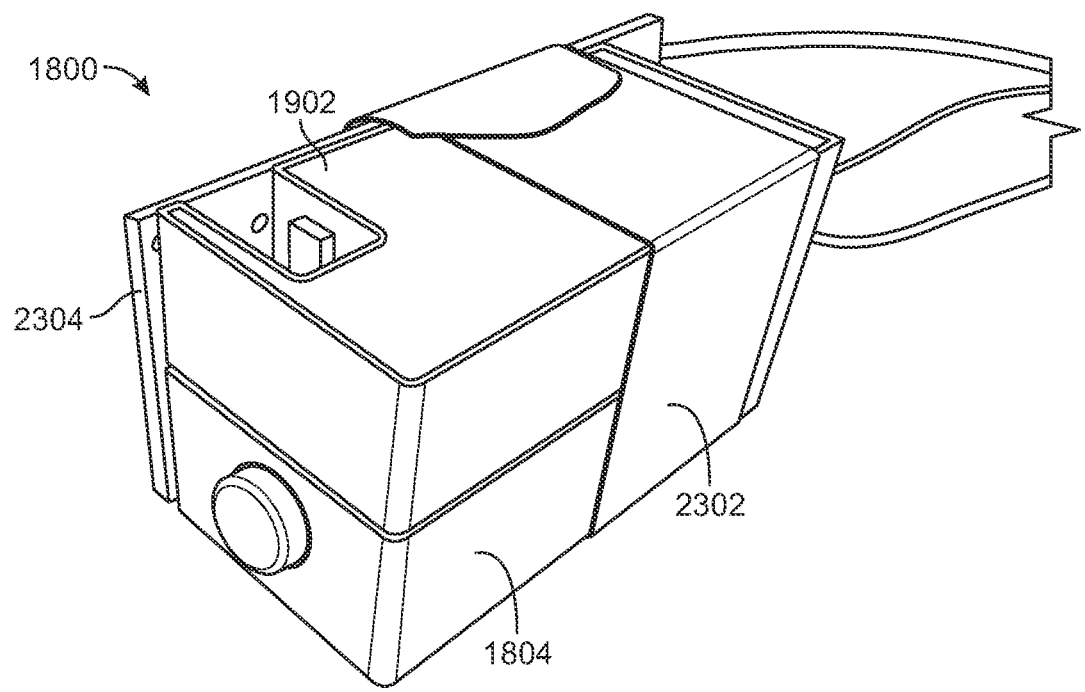
FIG. 23 is a perspective view diagram of a fully assembled embodiment of a microfluidic device.

Referring to FIG. 23, the microfluidic device 1800 is depicted as fully assembled and includes the upper body 1902, the lower body 1804, another inert tape holding 2302 the assembly together, and a circuit board 2304. The circuit board 2304 may include circuitry to control any motor or other type of magnetic field source used to drive the pumping action of the microfluidic device 1800.

As explained above, a benefit of the device 1800, in addition to preventing contact between the MSM element 2012 and a fluid passing through the device 1800, may be found in its simplicity to manufacture. Other benefits and advantages may exist.

Figure 24:
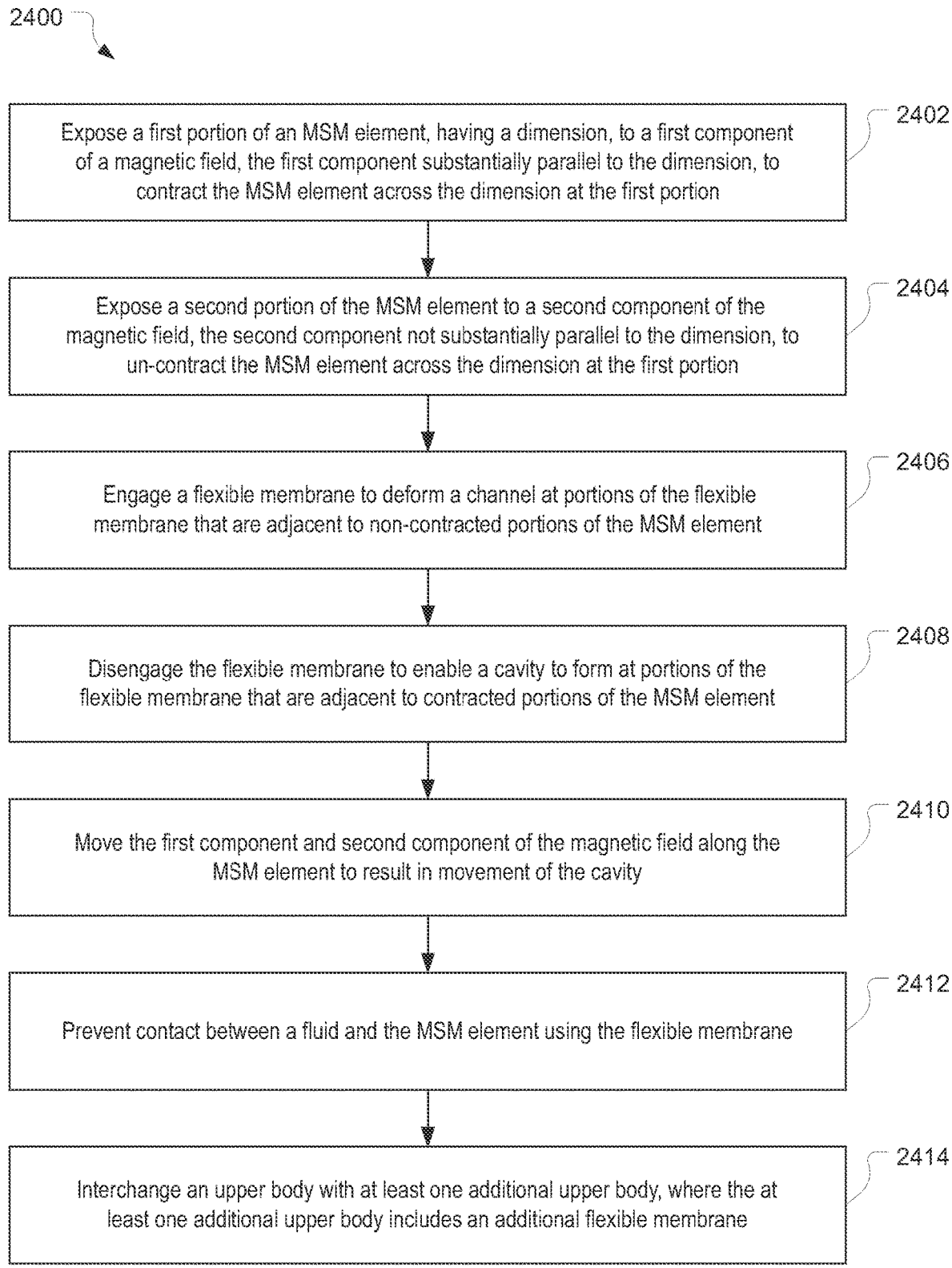
FIG. 24 is a flowchart depicting an embodiment of a method for microfluidic actuation.

Referring to FIG. 24, a method 2400 for microfluidic actuation is depicted. The method 2400 may include exposing a first portion of an MSM element, having a dimension, to a first component of a magnetic field, the first component substantially parallel to the dimension, to contract the MSM element across the dimension at the first portion, at 2402.

The method 2400 may further include exposing a second portion of the MSM element to a second component of the magnetic field, the second component not substantially parallel to the dimension, to un-contract the MSM element across the dimension at the first portion, at 2404.

The method 2400 may also include engaging a flexible membrane to deform a channel at portions of the flexible membrane that are adjacent to non-contracted portions of the MSM element, at 2406. As an example, the flexible membrane may include the flexible tube 104, the flexible tube 1006, the film 1402, the inert tape 1714, or the inert tape 2014.

The method 2400 may include disengaging the flexible membrane to enable a cavity to form at portions of the flexible membrane that are adjacent to contracted portions of the MSM element, at 2408.

The method 2400 may further include moving the first component and second component of the magnetic field along the MSM element to result in movement of the cavity, at 2410.

The method 2400 may also include preventing contact between a fluid and the MSM element using the flexible membrane, at 2412. For example, the flexible tube 104, the flexible tube 1006, the film 1402, the inert tape 1714, or the inert tape 2014 may form a barrier between an MSM element and a fluid within the cavity.

The method 2400 may include interchanging an upper body with at least one additional upper body, where the at least one additional upper body includes an additional flexible membrane, at 2414. For example, after a first fluid is pumped, the upper body may be replaced by an additional upper body to pump an additional fluid.

Figure 25:
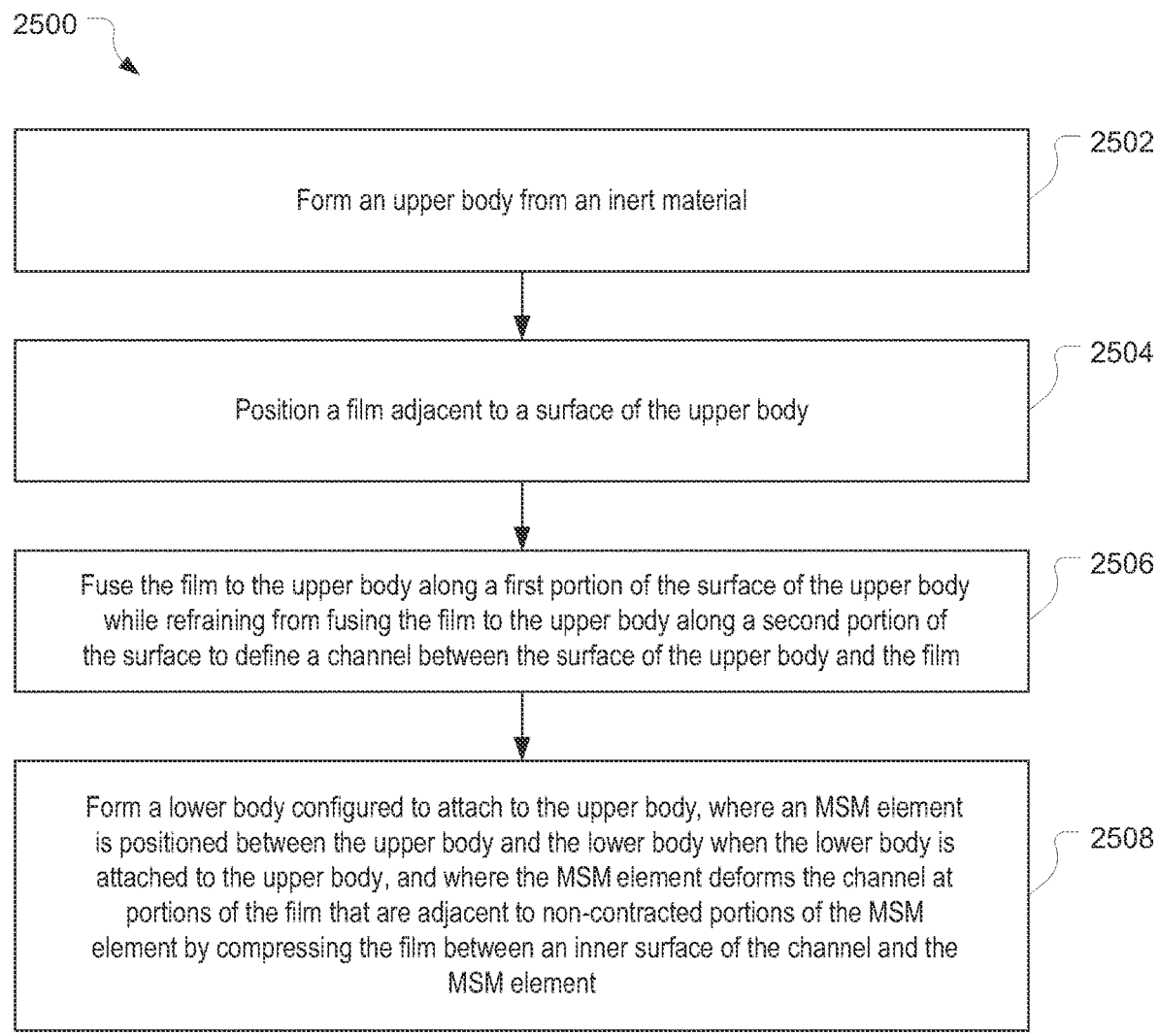
FIG. 25 is a flowchart depicting an embodiment of a method for making a microfluidic device.

Referring to FIG. 25, a method 2500 is depicted. The method 2500 may include forming an upper body from an inert material, at 2502. As an example, the upper body 1302 may be formed.

The method 2500 may further include positioning a film adjacent to a surface of the upper body, at 2504. For example, the film 1402 may be placed adjacent to the upper body 1302.

The method 2500 may also include fusing the film to the upper body along a first portion of the surface of the upper body while refraining from fusing the film to the upper body along a second portion of the surface to define a channel between the surface of the upper body and the film, at 2506. For example, fusing the film to the upper body may include applying heat and pressure to the film using a heat block shaped to apply heat adjacent to the first portion of the surface of the upper body and not apply the heat adjacent to the second portion of the surface of the upper body. As another example, fusing the film to the upper body may include forming the film from a vulcanizing tape and applying a catalyst to the first portion of the surface of the upper body, wherein the catalyst results in vulcanization of the vulcanizing tape at the first portion, and wherein the vulcanizing tape remains un-vulcanized at the second portion of the surface of the upper body.

The method 2500 may include forming a lower body configured to attach to the upper body, where an MSM element is positioned between the upper body and the lower body when the lower body is attached to the upper body, and where the MSM element deforms the channel at portions of the film that are adjacent to non-contracted portions of the MSM element by compressing the film between an inner surface of the channel and the MSM element, at 2508.

Although various embodiments have been shown and described, the present disclosure is not so limited and will be understood to include all such modifications and variations as would be apparent to one skilled in the art. For example, any of the features and elements relating to any of the embodiments described herein, or relating to any embodiment of another disclosure that has been incorporated herein by reference, may be applied to any other embodiment described herein, even if not explicitly described as pertaining to such other embodiment.

What is claimed is:

1. A magnetic shape memory (MSM) microfluidic device comprising:
an MSM element having a dimension, and configured to contract across the dimension at a first portion of the MSM element that is exposed to a first component of a magnetic field, the first component substantially parallel to the dimension, and simultaneously not contract across the dimension at a second portion of the MSM element that is exposed to a second component of the magnetic field, the second component not substantially parallel to the dimension; and
a flexible membrane positioned between a channel and the MSM element, wherein the MSM element engages the flexible membrane to deform the channel at portions of the flexible membrane that are adjacent to the MSM element, and wherein the flexible membrane prevents contact between a fluid within the channel and the MSM element.

2. The device of claim 1, wherein the MSM element engages the flexible membrane to enable a cavity to form at portions of the flexible membrane that are adjacent to contracted portions of the MSM element, and wherein movement of the first component and second component of the magnetic field along the MSM element results in movement of the cavity.

3. The device of claim 1, wherein the flexible membrane includes an inert material such as polyvinylchloride (PVC), polyethersulfone (PES), polytetrafluoroethylene (PTFE), low-density-polyethylene (PE-LD), high-density-polyethylene (PE-HD), ultra-high-molecular-weight polyethylene (PE-UHMW), polyurethane (PU), polyetherimide (PEI), polycarbonate (PC), polysulfone (PS), polyetheretherketone (PEEK), polypropylene (PP), polytetrafluoroethylene (PTFE, Teflon), or any combination thereof.

4. The device of claim 1, further comprising at least one port providing fluid access to the channel.

5. The device of claim 1, wherein the flexible membrane is a portion of a wall of a flexible tube, wherein the channel is defined within the flexible tube, wherein the device further comprises a body, wherein the flexible tube is positioned between the body and the MSM element, and wherein the MSM element compresses the channel at the portions of the flexible membrane that are adjacent to the non-contracted portions of the MSM element by compressing the tube between the body and the MSM element at portions of the tube that are adjacent to the non-contracted portions of the MSM element, and wherein the MSM element opens the channel at portions of the tube that are adjacent to the contracted portions of the MSM element.

6. The device of claim 1, further comprising:
an upper body, wherein the flexible membrane is a film fused to the upper body along a first portion of a surface of the upper body, and wherein the channel is defined along a second portion of the surface of the upper body to which the film is not fused; and
a lower body configured to attach to the upper body, wherein the MSM element is positioned between the upper body and the lower body, and wherein the MSM element compresses the channel at the portions of the film that are adjacent to the non-contracted portions of the MSM element by compressing the film between the upper body and the MSM element at portions of the film that are adjacent to the non-contracted portions of the MSM element, and wherein the MSM element opens the channel at portions of the film that are adjacent to the contracted portions of the MSM element.

7. The device of claim 6, wherein the upper body is interchangeable with additional upper bodies having additional channels defined therein and having additional films, and wherein, when the additional upper bodies are attached to the lower body, the MSM element deforms the additional channels at portions of the additional films that are adjacent to the non-contracted portions of the MSM element by compressing the additional films between the additional upper bodies and the MSM element at portions of the additional films that are adjacent to the non-contracted portions of the MSM element, and wherein the MSM element opens the channel at portions of the additional films that are adjacent to the contracted portions of the MSM element.

8. The device of claim 1, further comprising:
an upper body, wherein the channel is defined within the upper body; and
a lower body configured to attach to the upper body, wherein the MSM element is attached to the lower body, wherein the membrane is a film attached to the lower body and covering the MSM element, wherein a pressure fit between the film and the upper body seals the channel when the upper body and the lower body are attached, and wherein the MSM element deforms the channel at the portions of the flexible membrane that are adjacent to the non-contracted portions of the MSM element by compressing the membrane between an inner surface of the channel and the MSM element.

9. The device of claim 8, wherein the film is an adhesive tape and holds the MSM element in place.

10. The device of claim 8, further comprising a second membrane positioned between the MSM element and the lower body.

11. A magnetic shape memory (MSM) actuation method comprising:
exposing a first portion of an MSM element, having a dimension, to a first component of a magnetic field, the first component substantially parallel to the dimension, to contract the MSM element across the dimension at the first portion;
exposing a second portion of the MSM element to a second component of the magnetic field, the second component not substantially parallel to the dimension, to un-contract the MSM element across the dimension at the second portion;
engaging a flexible membrane to deform a channel at portions of the flexible membrane that are adjacent to the MSM element; and
preventing contact between a fluid and the MSM element using the flexible membrane.

12. The method of claim 11, further comprising:
engaging the flexible membrane to enable a cavity to form at portions of the flexible membrane that are adjacent to contracted portions of the MSM element.

13. The method of claim 12, further comprising:
moving the first component and second component of the magnetic field along the MSM element to result in movement of the cavity.

14. The method of claim 11, wherein the flexible membrane is incorporated into an upper body, wherein the MSM element is incorporated into a lower body, the method further comprising:
interchanging the upper body with at least one additional upper body wherein at least one additional upper body comprises an additional flexible membrane.

15. The method of claim 11, wherein the flexible membrane includes an inert material such as polyvinylchloride (PVC), polyethersulfone (PES), polytetrafluoroethylene (PTFE), low-density-polyethylene (PE-LD), high-density-polyethylene (PE-HD), ultra-high-molecular-weight polyethylene (PE-UHMW), polyurethane (PU), polyetherimide (PEI), polycarbonate (PC), polysulfone (PS), polyetheretherketone (PEEK), polypropylene (PP), polytetrafluoroethylene (PTFE, Teflon), or any combination thereof.

16. A method comprising:
forming an upper body from an inert material;
positioning a film adjacent to a surface of the upper body;
bonding the film to the upper body along a first portion of the surface of the upper body while refraining from bonding the film to the upper body along a second portion of the surface to define a channel between the surface of the upper body and the film; and
forming a lower body configured to attach to the upper body, wherein an MSM element is positioned between the upper body and the lower body when the lower body is attached to the upper body, and wherein the MSM element deforms the channel at portions of the film that are adjacent to non-contracted portions of the MSM element by compressing the film between the upper body and the MSM element at portions of the film that are adjacent to the non-contracted portions of the MSM element, and wherein the MSM element opens the channel at portions of the film that are adjacent to the contracted portions of the MSM element.

17. The method of claim 16, wherein bonding the film to the upper body comprises applying heat and pressure to the film using a heat block shaped to apply heat adjacent to the first portion of the surface of the upper body and not applying the heat adjacent to the second portion of the surface of the upper body.

18. The method of claim 16, further comprising forming the film from a vulcanizing tape, wherein fusing the film to the upper body comprises applying a catalyst to the first portion of the surface of the upper body, wherein the catalyst results in vulcanization of the vulcanizing tape at the first portion, and wherein the vulcanizing tape remains unvulcanized at the second portion of the surface of the upper body.

19. The method of claim 16, wherein forming the upper body and forming the lower body are performed using additive manufacturing such as high-resolution stereo lithography with liquid resin, digital light processing with liquid resin, and multijet printing.

20. The method of claim 16, wherein the film includes an inert material such as polyvinylchloride (PVC), polyethersulfone (PES), polytetrafluoroethylene (PTFE), low-density-polyethylene (PE-LD), high-density-polyethylene (PE-HD), ultra-high-molecular-weight polyethylene (PE-UHMW), polyurethane (PU), polyetherimide (PEI), polycarbonate (PC), polysulfone (PS), polyetheretherketone (PEEK), polypropylene (PP), polytetrafluoroethylene (PTFE, Teflon), or any combination thereof.

* * * * *